(12) United States Patent
Masuya et al.

(10) Patent No.: US 11,504,781 B2
(45) Date of Patent: Nov. 22, 2022

(54) TWIN-HEAD BAR CUTTING DEVICE

(71) Applicant: NORITAKE CO., LIMITED, Nagoya (JP)

(72) Inventors: Katsuyuki Masuya, Komaki (JP); Takaaki Shirozu, Komaki (JP)

(73) Assignee: NORITAKE CO., LIMITED, Nagoya (JP)

( * ) Notice: Subject to any disclaimer, the term of this patent is extended or adjusted under 35 U.S.C. 154(b) by 181 days.

(21) Appl. No.: 16/669,588

(22) Filed: Oct. 31, 2019

(65) Prior Publication Data
US 2020/0130074 A1 Apr. 30, 2020

(30) Foreign Application Priority Data
Oct. 31, 2018 (JP) .............................. JP2018-206067

(51) Int. Cl.
*B23D 45/10* (2006.01)
*B23D 47/02* (2006.01)
*B23D 47/04* (2006.01)

(52) U.S. Cl.
CPC ........... *B23D 45/105* (2013.01); *B23D 45/10* (2013.01); *B23D 47/02* (2013.01); *B23D 47/042* (2013.01)

(58) Field of Classification Search
CPC .... B23D 45/105; B23D 47/02; B23D 47/042; B23D 45/10
USPC ... 83/485, 471.3, 490, 487, 437.7, 799, 488, 83/303, 471.1
See application file for complete search history.

(56) References Cited

U.S. PATENT DOCUMENTS

| | | | | |
|---|---|---|---|---|
| 1,645,924 A | * | 10/1927 | Palmigiano, Jr. ......... | B27B 5/10 83/492 |
| 3,379,227 A | * | 4/1968 | Mason ..................... | B27B 5/18 83/471.2 |
| 3,413,881 A | * | 12/1968 | Stolzer ................. | B23D 45/105 83/486 |
| 3,578,043 A | * | 5/1971 | Menge ................... | B23D 45/10 83/471.3 |
| 3,665,982 A | * | 5/1972 | Kvalheim ............... | B27B 31/08 144/245.4 |
| 3,854,360 A | * | 12/1974 | Reed ....................... | B27B 27/10 83/522.19 |

(Continued)

FOREIGN PATENT DOCUMENTS

| | | | | |
|---|---|---|---|---|
| DE | 3100538 A | * | 8/1982 | .......... B23D 45/021 |
| JP | 2004-136398 A | | 5/2004 | |

(Continued)

*Primary Examiner* — Laura M Lee
(74) *Attorney, Agent, or Firm* — Oliff PLC

(57) ABSTRACT

A twin-head bar cutting device includes a first cutting head and a first bar holding device as well as a second cutting head and a second bar holding device placed on a common base. The base includes a first placement surface on which the first cutting head is placed, a second placement surface on which the second cutting head is placed, and a holding device placement surface formed higher than the first placement surface and the second placement surface between the first placement surface and the second placement surface and on which the first bar holding device and the second bar holding device are placed, and the first cutting head and the second cutting head are arranged symmetrically about a vertical plane passing through a center in a width direction of the base.

3 Claims, 10 Drawing Sheets

(56) References Cited

U.S. PATENT DOCUMENTS

| | | | | |
|---|---|---|---|---|
| 4,043,167 A * | 8/1977 | Koser | ............... | B21C 37/28 |
| | | | | 72/340 |
| 4,208,934 A * | 6/1980 | Wall | ............... | B27B 27/04 |
| | | | | 83/490 |
| 4,243,082 A * | 1/1981 | Paris, Jr. | ............... | B27F 5/02 |
| | | | | 144/133.1 |
| 5,860,346 A * | 1/1999 | McKeegan, Jr. | ............... | B23D 45/024 |
| | | | | 83/485 |
| 6,021,701 A * | 2/2000 | McKeegan, Jr. | ............... | B23D 19/04 |
| | | | | 83/485 |
| 6,250,191 B1 * | 6/2001 | Raffoni | ............... | B23D 45/146 |
| | | | | 83/486.1 |
| 2007/0209651 A1 * | 9/2007 | Ketterhagen | ............... | B28D 1/045 |
| | | | | 125/13.01 |

FOREIGN PATENT DOCUMENTS

| JP | 2004-136399 A | 5/2004 |
|---|---|---|
| JP | 2011-240463 A | 12/2011 |

* cited by examiner

TWIN-HEAD BAR CUTTING DEVICE

This application claims priority from Japanese Patent Application No. 2018-206067 filed on Oct. 31, 2018, the disclosure of which is herein incorporated by reference in its entirety.

FIELD OF THE INVENTION

The present invention relates to a bar cutting machine causing a rotating circular saw to cut into an elongated bar in a transverse direction and thereby cutting the bar to a desired length and, more particularly, to a space-saving twin-head bar cutting device.

DESCRIPTION OF THE RELATED ART

There is known a bar cutting machine including a disk-shaped circular saw having an outer circumferential portion provided with multiple peripheral cutting edges provided along a circumferential direction which is rotated to cut into an elongated bar material such as a rolled material or a drawing material so as to cut the bar material to a predetermined length dimension, wherein the bar cutting machine further includes a clamp device having not only a horizontal vise but also a vertical vise, the horizontal vise clamping in a horizontal direction a vicinity of an end portion of the bar into which the circular saw is cut, and the vertical vise clamping the bar in a vertical direction. For example, this corresponds to machines described in Patent Documents 1 to 3. According to such a bar cutting machine, end surfaces of cut bar pieces used as materials for various components have higher quality in surface accuracy and surface roughness as compared to a bar shearing machine (billet shear).

PRIOR ART DOCUMENTS

Patent Documents

Patent Document 1: Japanese Laid-Open Patent Publication No. 2011-240463
Patent Document 2: Japanese Laid-Open Patent Publication No. 2004-136398
Patent Document 3: Japanese Laid-Open Patent Publication No. 2004-136399

SUMMARY OF THE INVENTION

Technical Problem

The bar cutting machine described above requires a predetermined cutting time for cutting using a circular saw and therefore has a disadvantage that a cutting efficiency is lower than a bar shearing machine. Therefore, to achieve a cutting efficiency comparable to that of a bar shearing machine, it is necessary to arrange multiple bar cutting machines, and therefore, the bar cutting machine has a disadvantage that if multiple bar cutting machines are independently arranged parallel, machines occupy a larger space than the bar shearing machine in the case of arrangement in a factory.

On the other hand, to make a width dimension W of a facility smaller and reduce an installation space, for example, as shown in FIG. 10, it is conceivable that a twin-head bar cutting device 314 is made up of a first bar cutting device 304 including a first cutting machine 300 and a first bar holding device 302 and a second bar cutting device 310 including a second cutting machine 306 and a second bar holding device 308 arranged on a common base 312.

However, when the two bar cutting devices 304 and 310 are arranged on the common base 312 as described above, a height of a central portion of the common base 312 in the width direction becomes lower than the other portions so that the rigidity of the central portion becomes insufficient, resulting in a disadvantage that the base is unstable during transportation and installation.

The present invention was conceived in view of the situations and it is therefore an object of the present invention to provide a twin-head bar cutting device having a smaller installation space than two bar cutting devices and ensuring a rigidity of a base.

Solution to Problem

To achieve the above object, a first aspect of the present invention provides a twin-head bar cutting device including a first cutting head and a first bar holding device as well as a second cutting head and a second bar holding device placed on a common base, wherein the base includes a first placement surface on which the first cutting head is placed, a second placement surface on which the second cutting head is placed, and a holding device placement surface formed higher than the first placement surface and the second placement surface between the first placement surface and the second placement surface and on which the first bar holding device and the second bar holding device are placed, and wherein the first cutting head and the second cutting head are arranged symmetrically about a vertical plane passing through a center in a width direction of the base.

Advantageous Effects of Invention

According to the twin-head bar cutting device recited in the first aspect of the invention, the base includes the first placement surface on which the first cutting head is placed, the second placement surface on which the second cutting head is placed, and the holding device placement surface formed higher than the first placement surface and the second placement surface between the first placement surface and the second placement surface and on which the first bar holding device and the second bar holding device are placed, and wherein the first cutting head and the second cutting head are arranged symmetrically about the vertical plane passing through the center in the width direction of the base. Therefore, the first cutting head and the second cutting head are arranged in a symmetric manner with the first bar holding device and the second bar holding device interposed therebetween. The twin-head bar cutting device acquired in this way has an installation space smaller than that for two bar cutting devices and ensures the rigidity of the base.

Preferably, in the twin-head bar cutting device, the first placement surface is lower than the second placement surface, and a portion of the first bar holding device is overlapped in a vertical direction on the lower side of the second bar holding device. As a result, the width dimension of the base is further reduced, so that the installation space of the base is further reduced.

Preferably, in the twin-head bar cutting device, the first placement surface has the same height as the second placement surface, and the first bar holding device and the second bar holding device are arranged on the holding device placement surface symmetrically about a vertical plane passing through a center in a width direction of the holding device placement surface. As a result, the base is made higher at the center in the width direction and is symmetric about the vertical plane at the center in the width direction, so that the base has a relatively small size and relatively high rigidity.

Preferably, in the twin-head bar cutting device, (a) the first cutting head includes a disk-shaped first circular saw supported rotatably around a first rotation center line, a first electric motor having an output shaft thereof rotating around a second rotation center line parallel to the first rotation center line and rotationally driving the first circular saw via a first transmission belt, a first pivot frame supporting the first circular saw and the first electric motor and disposed pivotally around a first pivot center line parallel to the first rotation center line and the second rotation center line, and a first pivot actuator causing the first pivot frame to pivot so as to allow the first circular saw to cut the first bar, (b) the first bar holding device includes a first fixed holding vise, a first movable holding vise disposed to move closer to and away from the first fixed holding vise, and a first holding actuator driving the first movable holding vise, and holds the first bar to be cut by the first circular saw on the side opposite to the second rotation center line with respect to the first pivot center line; (c) the second cutting head includes a disk-shaped second circular saw supported rotatably around a third rotation center line, a second electric motor having an output shaft thereof rotating around a fourth rotation center line parallel to the third rotation center line and rotationally driving the second circular saw via a second transmission belt, a second pivot frame supporting the second circular saw and the second electric motor and disposed pivotally around a second pivot center line parallel to the third rotation center line and the fourth rotation center line, and a second pivot actuator causing the second pivot frame to pivot so as to allow the second circular saw to cut the second bar, (d) the second bar holding device includes a second fixed holding vise, a second movable holding vise disposed to move closer to and away from the second fixed holding vise, and a second holding actuator driving the second movable holding vise, and holds the second bar to be cut by the second circular saw on the side opposite to the fourth rotation center line with respect to the second pivot center line; (e) the first bar holding device and the second bar holding device are arranged on the base between the first pivot center line and the second pivot center line; and (f) a pivot direction of the first pivot frame around the first pivot center line at the time of cutting of the first bar is opposite to a pivot direction of the second pivot frame around the second pivot center line at the time of cutting of the second bar. Therefore, the first cutting head and the second cutting head are symmetrically arranged with the first bar holding device and the second bar holding device interposed therebetween. As a result, the twin-head bar cutting device having an installation space smaller than two bar cutting devices and ensuring the rigidity of the base is acquired.

Preferably, in the twin-head bar cutting device, the first placement surface and the second placement surface are inclined surfaces inclined such that height becomes lower as the surfaces approach each other, wherein the holding device placement surface disposed between the first placement surface and the second placement surface with the first bar holding device and the second bar holding device placed thereon is disposed horizontally and higher than lowest height positions of the first placement surface and the second placement surface, and the first bar holding device and the second bar holding device are arranged symmetrically about a vertical plane passing through a center in a width direction of the holding device placement surface. As a result, the base is made higher at the center in the width direction and is symmetric about the vertical plane at the center in the width direction, so that the base has a relatively small size and relatively high rigidity.

Preferably, in the twin-head bar cutting device, the first placement surface is provided with a first guide rail linearly guiding the first cutting head so as to cut the first bar held by the first bar holding device on the holding device placement surface, and the second placement surface is provided with a second guide rail linearly guiding the second cutting head so as to cut the second bar held by the second bar holding device on the holding device placement surface. As a result, the first cutting head and the second cutting head advantageously have the circular saws urged by a pressing force in accordance with the gravity in the direction of cutting of the bars held by the first bar holding device and the second bar holding device, respectively.

MODES FOR CARRYING OUT THE INVENTION

Examples of the present invention will now be described in detail with reference to the drawings. In the following examples, the figures are simplified or deformed as needed and portions are not necessarily precisely drawn in terms of dimension ratio, shape, etc.

First Example

Figure 1:
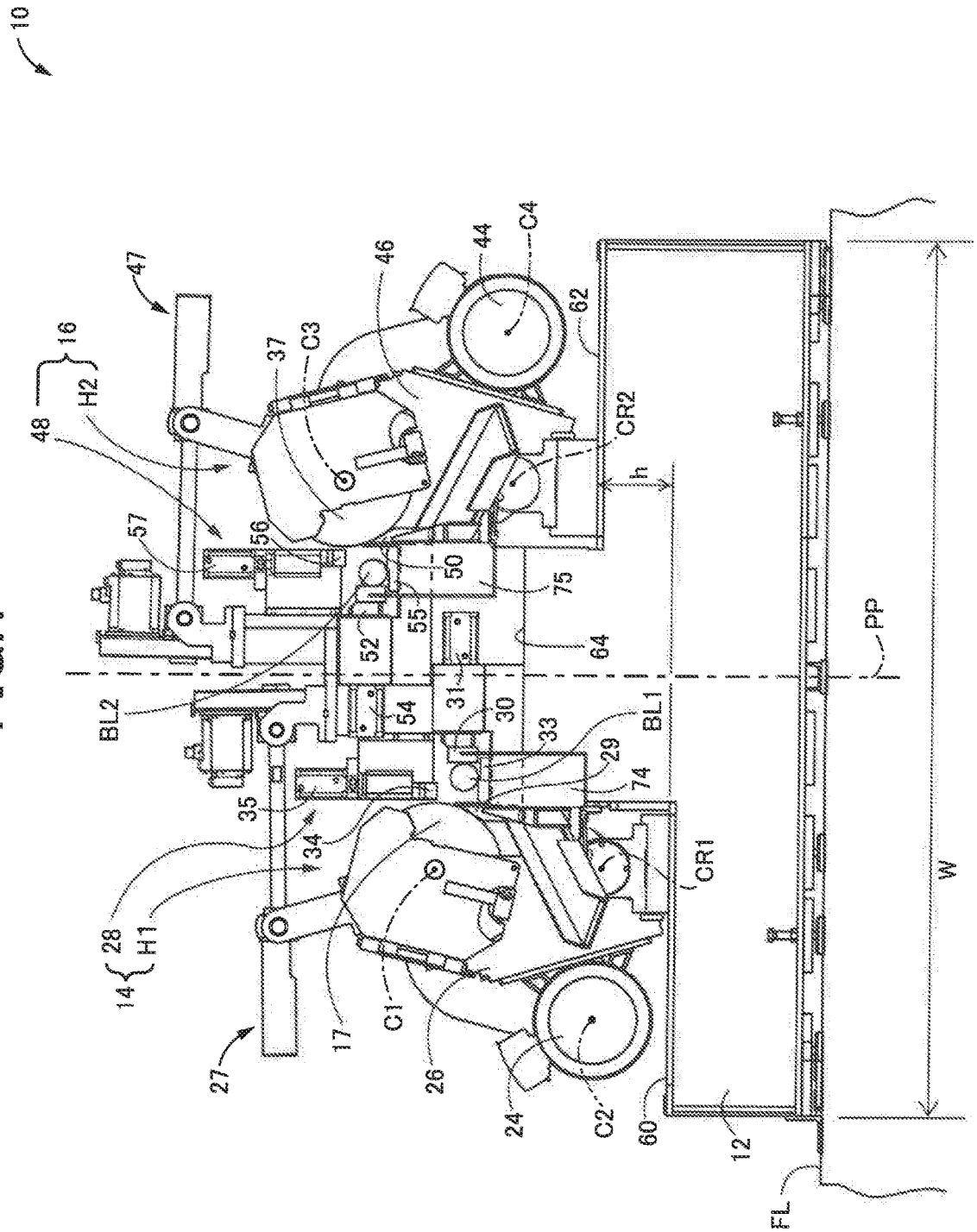
FIG. 1 is a front view showing a twin-head bar cutting device according to an example of the present invention.
Figure 2:
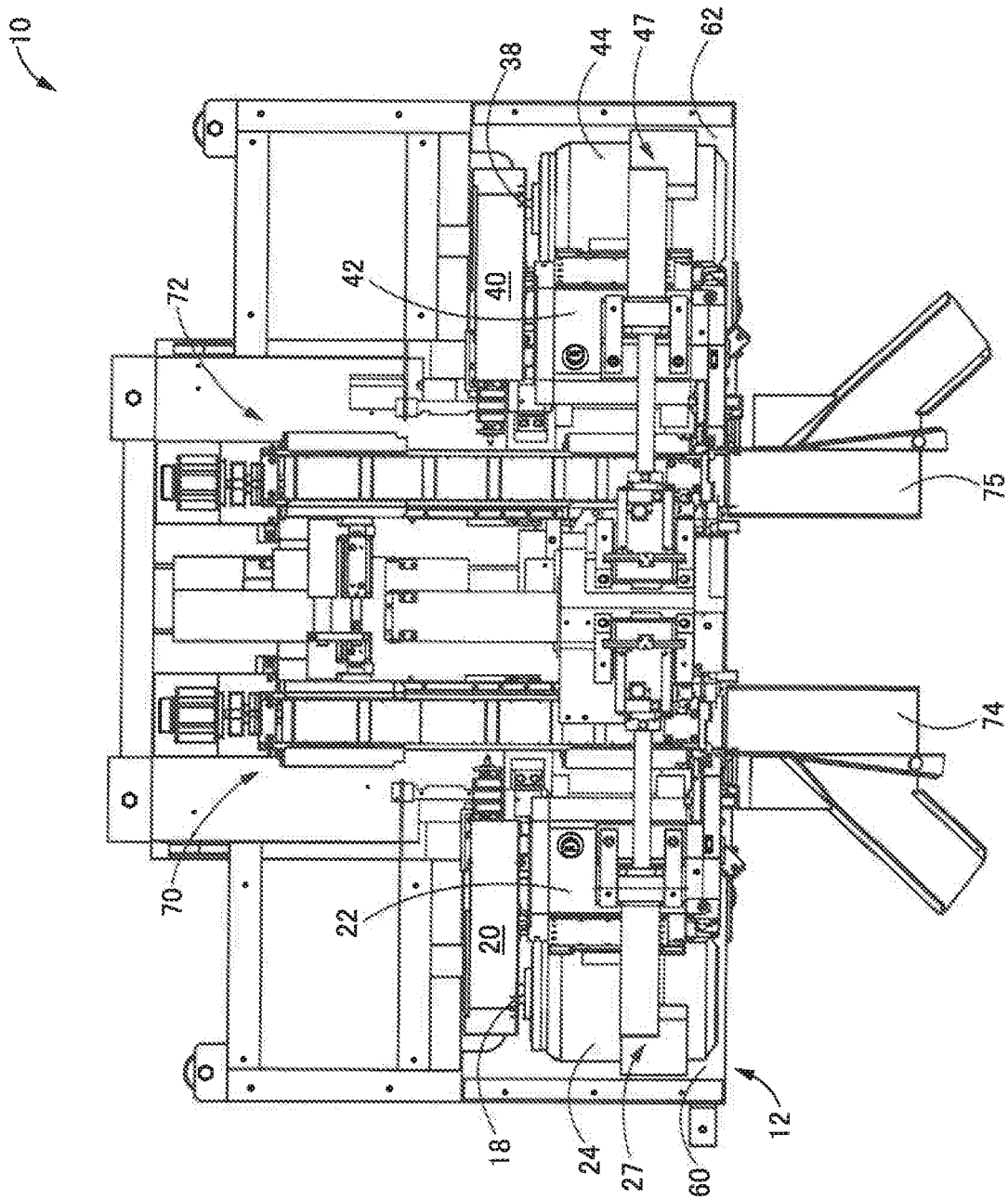
FIG. 2 is a plan view of the twin-head bar cutting device of FIG. 1.
Figure 3:
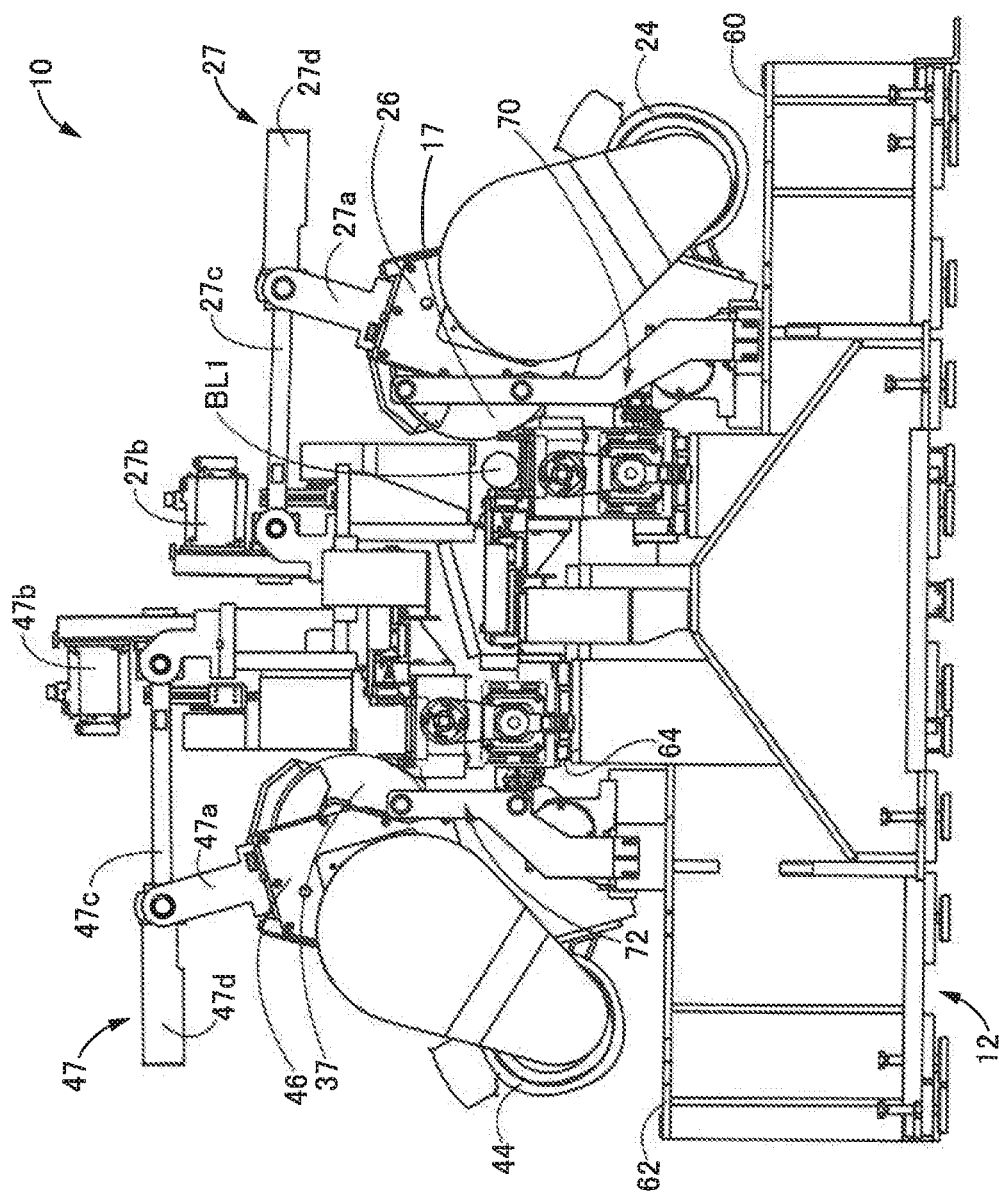
FIG. 3 is a rear view of the twin-head bar cutting device of FIG. 1.
Figure 4:
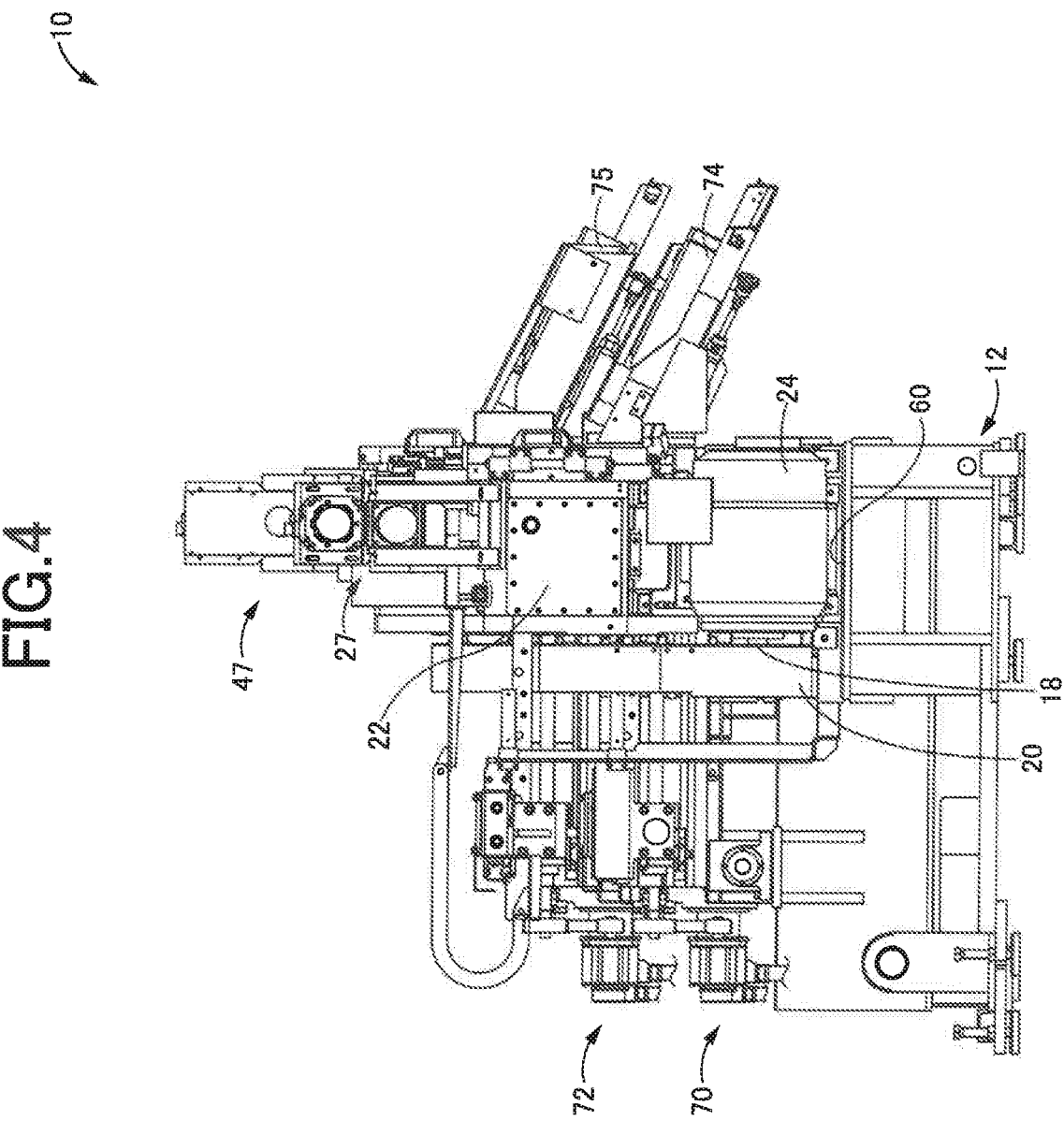
FIG. 4 is a side view of the twin-head bar cutting device of FIG. 1.

FIGS. 1, 2, 3, and 4 are respectively a front view, a plan view, a back view, and a side view from the left side of FIG. 1, showing a twin-head bar cutting device 10 according to an example of the present invention. In FIGS. 1, 2, 3, and 4, the twin-head bar cutting device 10 includes a base 12 disposed on a horizontal floor FL, and a first cutting machine 14 cutting a first bar BL1 to a predetermined dimension and a second cutting machine 16 cutting a second bar BL2 to a predetermined dimension, which are placed on the base 12. Therefore, the twin-head bar cutting device 10 has the first cutting machine 14 and the second cutting machine 16 placed on the common base 12. The first bar BL1 and the second bar BL2 are made of; for example, general steel such as carbon steel, alloy steel, stainless steel, aluminum alloy, copper alloy, etc. having a cross-sectional shape that is a circle, a square, an L shape, etc. and are metal elongated standard-sized bars of several meters before cutting.

The first cutting machine 14 includes a first cutting head H1 and a first bar holding device 28. The first cutting head H1 includes a disk-shaped first circular saw 17 supported rotatably around a first rotation center line C1, a first electric motor 24 having an output shaft 18 rotating around a second rotation center line C2 parallel to the first rotation center line C1 and rotationally driving the first circular saw 17 via a first transmission belt 20 and a first speed reducer 22, a first pivot frame 26 supporting the first circular saw 17 and the first electric motor 24 and disposed pivotally around a first pivot center line CR1 parallel to the first rotation center line C1 and the second rotation center line C2, and a first pivot actuator 27 causing the first pivot frame 26 to pivot so as to allow the first circular saw 17 to cut the first bar BL1.

The first pivot actuator 27 includes a screw shaft 27c pivotally disposed on a bracket 27a protruding from the base 12 and rotatably driven by a motor 27b, and a nut member 27d pivotally disposed on the first pivot frame 26 and screwed to the screw shaft 27c.

The first bar holding device 28 includes a first horizontal-direction holding device 32 and a first vertical-direction holding device 36. The first horizontal-direction holding device 32 includes a first fixed horizontal holding vise 29, a first movable horizontal holding vise 30 disposed to move closer to and away from the first fixed horizontal holding vise 29, and a first horizontal holding actuator 31 such as a hydraulic cylinder driving the first movable horizontal holding vise 30, and holds in the horizontal direction the first bar BL1 to be cut by the first circular saw 17, on the side opposite to the second rotation center line C2 with respect to the first pivot center line CR1. The first vertical-direction holding device 36 includes a first fixed vertical holding vise 33, a first movable vertical holding vise 34 disposed to move closer to and away from the first fixed vertical holding vise 33, and a first vertical holding actuator 35 such as a hydraulic cylinder driving the first movable vertical holding vise 34, and holds in the vertical direction the first bar BL1 to be cut by the first circular saw 17, on the side opposite to the second rotation center line C2 with respect to the first pivot center line CR1.

The second cutting machine 16 includes a second cutting head H2 having the same configuration as the first cutting head H1 and configured line-symmetrically, i.e., left-right symmetrically, to the first cutting head H1 about a vertical plane PP (vertical plane for the horizontal floor FL) passing through the center in a width W direction of the base 12 although higher by a predetermined height h in the vertical direction than the first cutting head H1, and a second bar holding device 48 configured as with the first bar holding device 28 although a holding direction of a second movable horizontal holding vise 52 is opposite to the first movable horizontal holding vise 30.

The second cutting head H2 includes a disk-shaped second circular saw 37 supported rotatably around a third rotation center line C3, a second electric motor 44 having an output shaft 38 rotating around a fourth rotation center line C4 parallel to the third rotation center line C3 and rotationally driving the second circular saw 37 via a second transmission belt 40 and a second speed reducer 42, a second pivot frame 46 supporting the second circular saw 37 and the second electric motor 44 and disposed pivotally around a second pivot center line CR2 parallel to the third rotation center line C3 and the fourth rotation center line C4, and a second pivot actuator 47 causing the second pivot frame 46 to pivot so as to allow the second circular saw 37 to cut the second bar BL2.

The second pivot actuator 47 includes a screw shaft 47c pivotally disposed on a bracket 47a protruding from the base 12 and rotatably driven by a motor 47b, and a nut member 47d pivotally disposed on the second pivot frame 46 and screwed to the screw shaft 47c.

The second bar holding device 48 includes a second horizontal-direction holding device 49 and a second vertical-direction holding device 58. The second horizontal-direction holding device 49 includes a second fixed horizontal holding vise 50 and the second movable horizontal holding vise 52 disposed to move closer to and away from the second fixed horizontal holding vise 50 as well as a second horizontal holding actuator 54 such as a hydraulic cylinder driving the second movable horizontal holding vise 52, and holds in the horizontal direction the second bar BL2 to be cut by the second circular saw 37, on the side opposite to the fourth rotation center line C4 with respect to the second pivot center line CR2. The second vertical-direction holding device 58 includes a second fixed vertical holding vise 55 and a second movable vertical holding vise 56 disposed to move closer to and away from the second fixed vertical holding vise 55 as well as a second vertical holding actuator 57 such as a hydraulic cylinder driving the second movable vertical holding vise 56, and holds in the vertical direction the second bar BL2 to be cut by the second circular saw 37, on the side opposite to the fourth rotation center line C4 with respect to the second pivot center line CR2.

The base 12 includes a horizontal first placement surface 60 on which the first cutting head H1 is placed, a horizontal second placement surface 62 formed higher by a predetermined height h than the first placement surface 60 and on which the second cutting head H2 is placed, and a horizontal holding device placement surface 64 formed higher than the first placement surface 60 and the second placement surface 62 between the first placement surface 60 and the second placement surface 62 in the width W direction of the base 12 (left-right direction of FIG. 1) and on which the first bar holding device 28 and the second bar holding device 48 are placed. The first bar holding device 28 and the second bar holding device 48 are arranged between the first pivot center line CR1 and the second pivot center line CR2 in the width W direction of the base 12.

Since the first cutting head H1 placed on the first placement surface 60 is lower than the second cutting head H2 placed on the second placement surface 62 which is formed higher than the first placement surface 60, a portion of the first bar holding device 28, i.e., the first vertical holding actuator 35, is overlapped in the vertical direction on the lower side of a portion of the second bar holding device 48, i.e., the second horizontal holding actuator 54.

In the twin-head bar cutting device 10, the pivot direction (a clockwise direction in FIG. 1) of the first pivot frame 26 around the first pivot center line CR1 at the time of cutting of the first bar BL1 is opposite to the pivot direction (a counterclockwise direction in FIG. 1) of the second pivot frame 46 around the second pivot center line CR2 at the time of cutting of the second bar BL2.

On the back side of the twin-head bar cutting device 10, a first constant-rate material feeding device 70 and a second constant-rate material feeding device 72 are provided for respectively feeding the first bar BL1 and the second bar BL2 supplied from a material supply device (not shown) to the first bar holding device 28 and the second bar holding device 48, in a longitudinal direction of each of the first bar BL1 and the second bar BL2 intermittently by a predetermined dimension for each cut. The first cutting machine 14 and the second cutting machine 16 are provided with chutes 74 and 75 respectively guiding the first bar BL1 and the second bar BL2 cut by the first cutting head H1 and the second cutting head H2 to storage containers (not shown).

As described above, in the twin-head bar cutting device 10 of this example, the first cutting head H1 and the first bar holding device 28 as well as the second cutting head H2 and the second bar holding device 48 are placed on the common base 12; the base 12 includes the first placement surface 60 on which the first cutting head H1 is placed, the second placement surface 62 on which the second cutting head H2 is placed, and the holding device placement surface 64 formed higher than the first placement surface 60 and the second placement surface 62 between the first placement surface 60 and the second placement surface 62 and on which the first bar holding device 28 and the second bar holding device 48 are placed; and the first cutting head H1 and the second cutting head H2 are arranged in a left-right symmetric manner with the first bar holding device 28 and the second bar holding device 48 interposed therebetween.

The twin-head bar cutting device 10 acquired in this way has an installation space smaller than that for two bar cutting devices and ensures the rigidity of the base 12. The heights of the first bar holding device 28 and the second bar holding device 48 themselves are lower than the heights of the first cutting machine 14 and the second cutting machine 16 themselves including the first circular saw 17 and the second circular saw 37, and therefore, with respect to the first placement surface 60 and the second placement surface 62 of the base 12 on which the first cutting machine 14 and the second cutting machine 16 are placed, the holding device placement surface 64 with the first bar holding device 28 and the second bar holding device 48 placed thereon between the first placement surface 60 and the second placement surface 62 can be disposed higher than the first placement surface 60 and the second placement surface 62, so that a height of a central portion in the width W direction of the base 12 can be made higher, and the rigidity of the base 12 is enhanced.

According to the twin-head bar cutting device 10 of this example, the first placement surface 60 is lower than the second placement surface 62, and the portion (the first vertical holding actuator 35) of the first bar holding device 28 is overlapped in the vertical direction on the lower side of the second bar holding device 48. As a result, the dimension of the base 12 in the width W direction is further reduced, so that the installation space of the base 12 is further reduced.

According to the twin-head bar cutting device 10 of this example, (a) the first cutting head H1 includes the disk-shaped first circular saw 17 supported rotatably around the first rotation center line C1, the first electric motor 24 having the output shaft 18 rotating around the second rotation center line C2 parallel to the first rotation center line C1 and rotationally driving the first circular saw 17 via the first transmission belt 20 and the first speed reducer 22, the first pivot frame 26 supporting the first circular saw 17 and the first electric motor 24 and disposed pivotally around the first pivot center line CR1 parallel to the first rotation center line C1 and the second rotation center line C2, and the first pivot actuator 27 causing the first pivot frame 26 to pivot so as to allow the first circular saw 17 to cut the first bar BL1; (b) the first bar holding device 28 includes a first fixed holding vise (the first fixed horizontal holding vise 29, the first fixed vertical holding vise 33), a first movable holding vise (the first movable horizontal holding vise 30, the first movable vertical holding vise 34) disposed to move closer to and away from the first fixed holding vise, and a first holding actuator (the first horizontal holding actuator 31, the first vertical holding actuator 35) driving the first movable holding vise, and holds the first bar BL1 to be cut by the first circular saw 17, on the side opposite to the second rotation center line C2 with respect to the first pivot center line CR1; (c) the second cutting head H2 includes the disk-shaped second circular saw 37 supported rotatably around the third rotation center line C3, the second electric motor 44 having the output shaft 38 rotating around the fourth rotation center line C4 parallel to the third rotation center line C3 and rotationally driving the second circular saw 37 via the second transmission belt 40 and the second speed reducer 42, the second pivot frame 46 supporting the second circular saw 37 and the second electric motor 44 and disposed pivotally around the second pivot center line CR2 parallel to the third rotation center line C3 and the fourth rotation center line C4, and the second pivot actuator 47 causing the second pivot frame 46 to pivot so as to allow the second circular saw 37 to cut the second bar BL2; (d) the second bar holding device 48 includes a second fixed holding vise (the second fixed horizontal holding vise 50, the second fixed vertical holding vise 55), a second movable holding vise (the second movable horizontal holding vise 52, the second movable vertical holding vise 56) disposed to move closer to and away from the second fixed holding vise, and a second holding actuator (the second horizontal holding actuator 54, the second vertical holding actuator 57) driving the second movable holding vise, and holds the second bar BL2 to be cut by the second circular saw 37, on the side opposite to the fourth rotation center line C4 with respect to the second pivot center line CR2; (e) the first bar holding device 28 and the second bar holding device 48 are arranged on the base 12 between the first pivot center line CR1 and the second pivot center line CR2; and (f) the pivot direction of the first pivot frame 26 around the first pivot center line CR1 at the time of cutting of the first bar BL1 is opposite to the pivot direction of the second pivot frame 46 around the second pivot center line CR2 at the time of cutting of the second bar BL2. As a result, the first cutting head H1 and the second cutting head H2 are arranged in a left-right symmetric manner with the first bar holding device 28 and the second bar holding device 48 interposed therebetween. Therefore, the twin-head bar cutting device 10 having an installation space smaller than two bar cutting devices and ensuring the rigidity of the base is acquired.

Second Example

Other examples of the present invention will be described. In the following description, portions common to the examples are denoted by the same reference numerals and will not be described.

Figure 5:
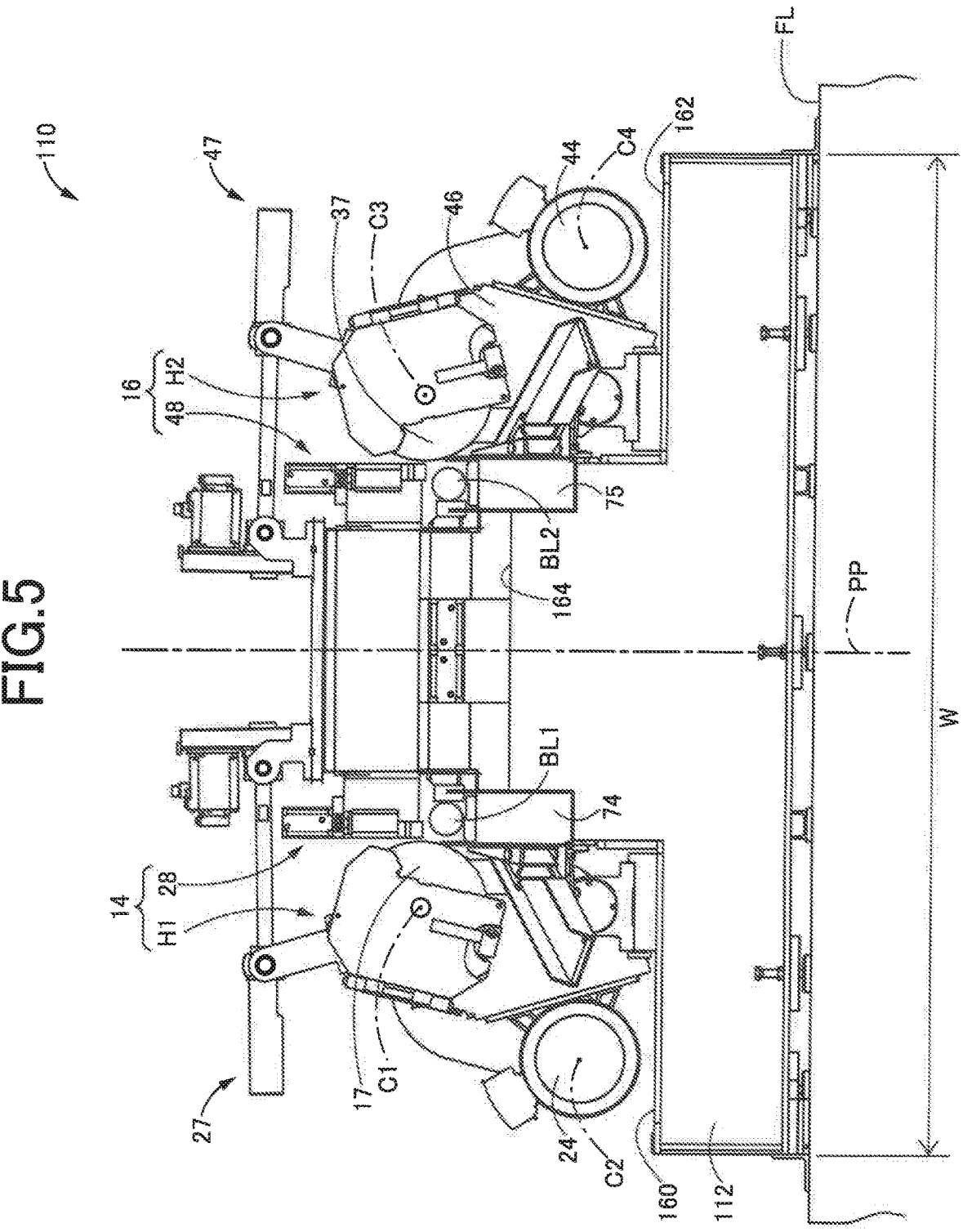
FIG. 5 is a front view of a twin-head bar cutting device of another example of the present invention, corresponding to FIG. 1.
Figure 6:
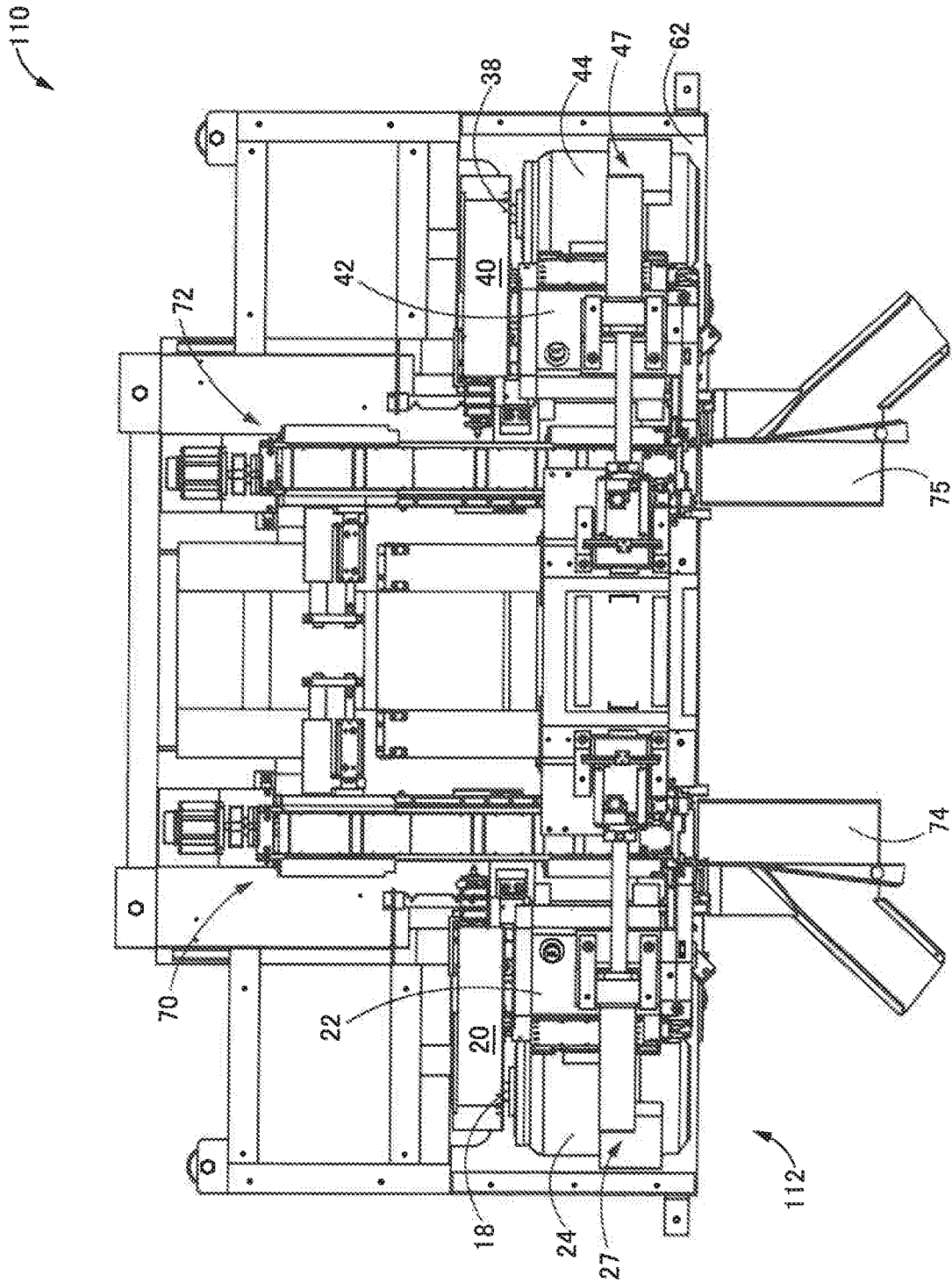
FIG. 6 is a plan view of the twin-head bar cutting device of FIG. 5, corresponding to FIG. 2.
Figure 7:
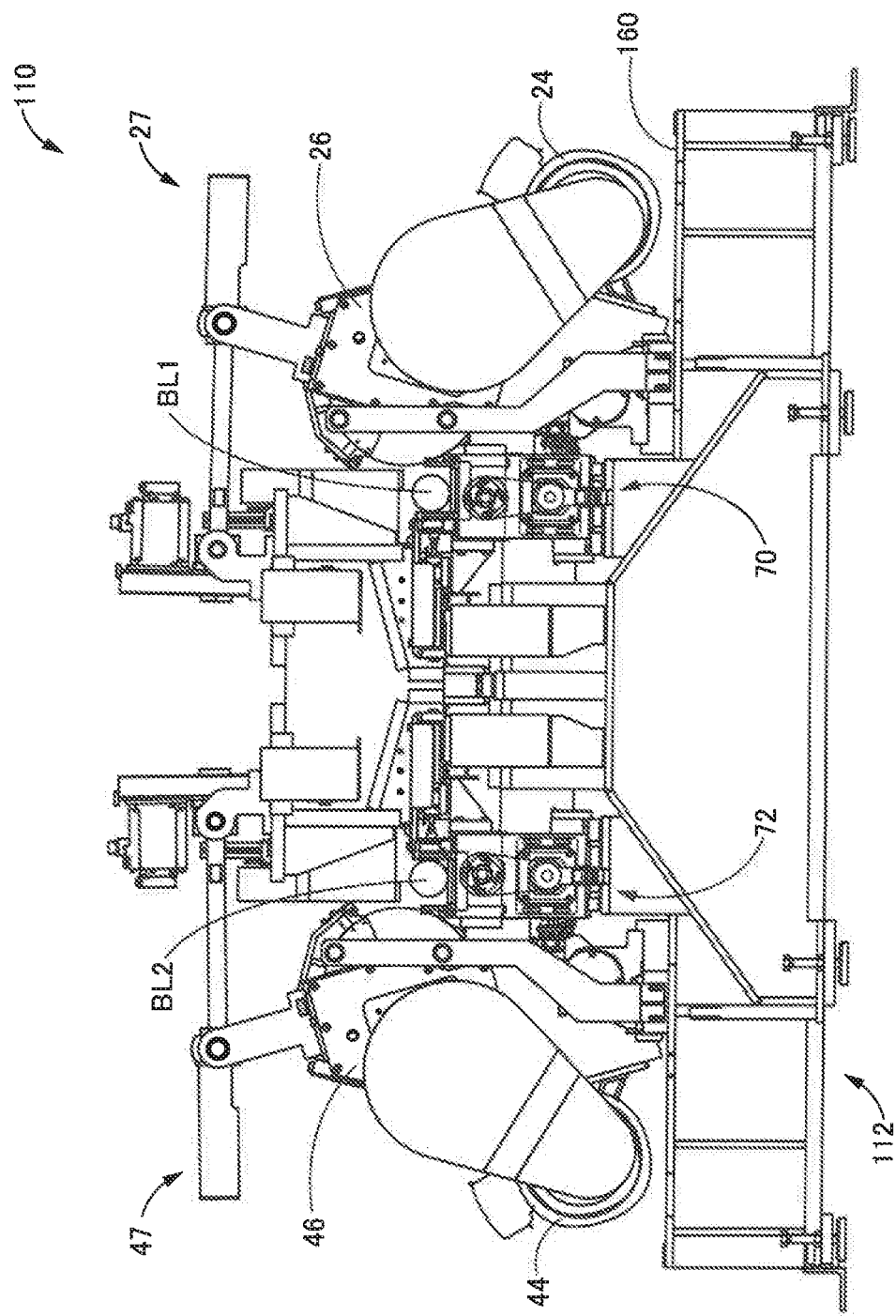
FIG. 7 is a rear view of the twin-head bar cutting device of FIG. 5, corresponding to FIG. 3.
Figure 8:
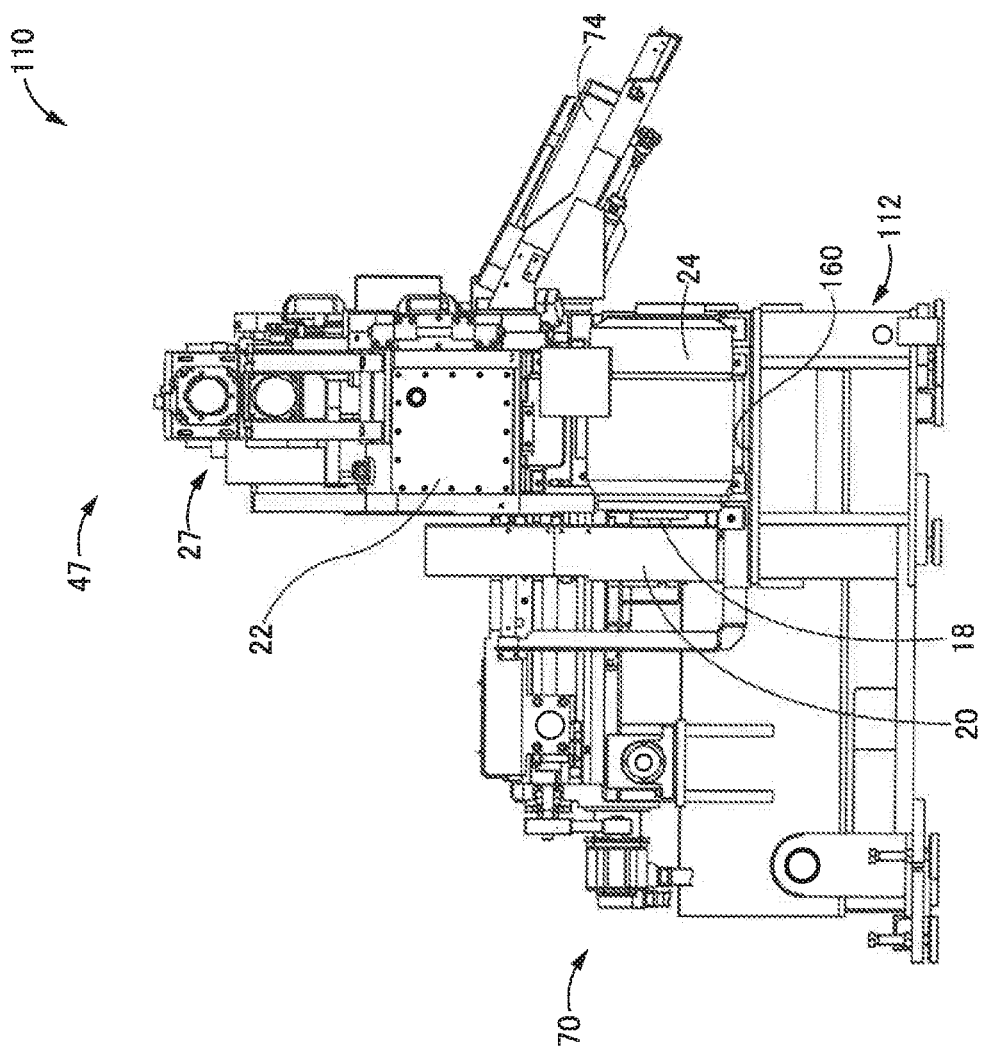
FIG. 8 is a side view of the twin-head bar cutting device of FIG. 5, corresponding to FIG. 4.

FIGS. 5, 6, 7, and 8 are respectively a front view, a plan view, a back view, and a side view from the left side of FIG. 5, showing a twin-head bar cutting device 110 according to another example of the present invention. In FIGS. 5, 6, 7, and 8, the twin-head bar cutting device 110 has the same configuration as the twin-head bar cutting device 10 of the example described above except a configuration of a base 112.

The base 112 of the twin-head bar cutting device 110 includes a horizontal first placement surface 160 on which the first cutting head H1 is placed, a horizontal second placement surface 162 having the same height as the first placement surface 160 and on which the second cutting head H2 is placed, and a horizontal holding device placement surface 164 disposed between the first placement surface 160 and the second placement surface 162 and on which the first bar holding device 28 and the second bar holding device 48 are symmetrically placed. On the holding device placement surface 164, the first bar holding device 28 and the second bar holding device 48 are arranged line-symmetrically about the vertical plane PP located at the center in a width W direction of the base 112, i.e., at the center in the width direction of the holding device placement surface 164, without being overlapped in the vertical direction as in the case of the twin-head bar cutting device 10. Consequently, the first cutting machine 14 and the second cutting machine 16 are arranged on the base 112 line-symmetrically about the vertical plane PP.

According to the twin-head bar cutting device 110 of this example, the first placement surface 160 has the same height as the second placement surface 162, and the first bar holding device 28 and the second bar holding device 48 are arranged on the holding device placement surface 164 symmetrically about the vertical plane PP passing through the center in the width direction of the holding device placement surface 164. As a result, the base 112 is made higher at the center in the width W direction and is symmetric about the vertical plane PP at the center in the width direction, so that the base 112 has a relatively small size and relatively high rigidity.

Third Example

Figure 9:
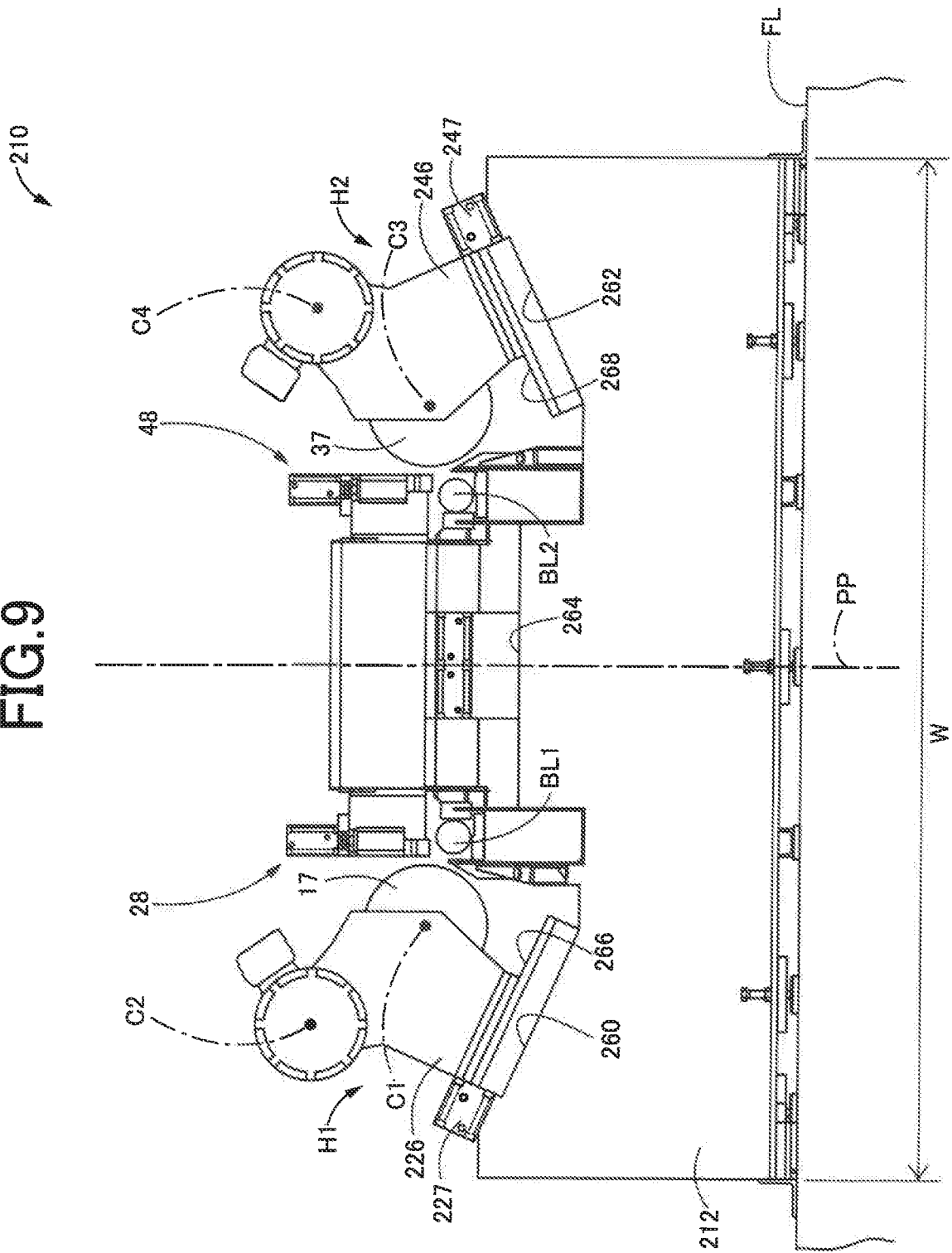
FIG. 9 is a front view of a twin-head bar cutting device of still another example of the present invention, corresponding to FIG. 1.
Figure 10:
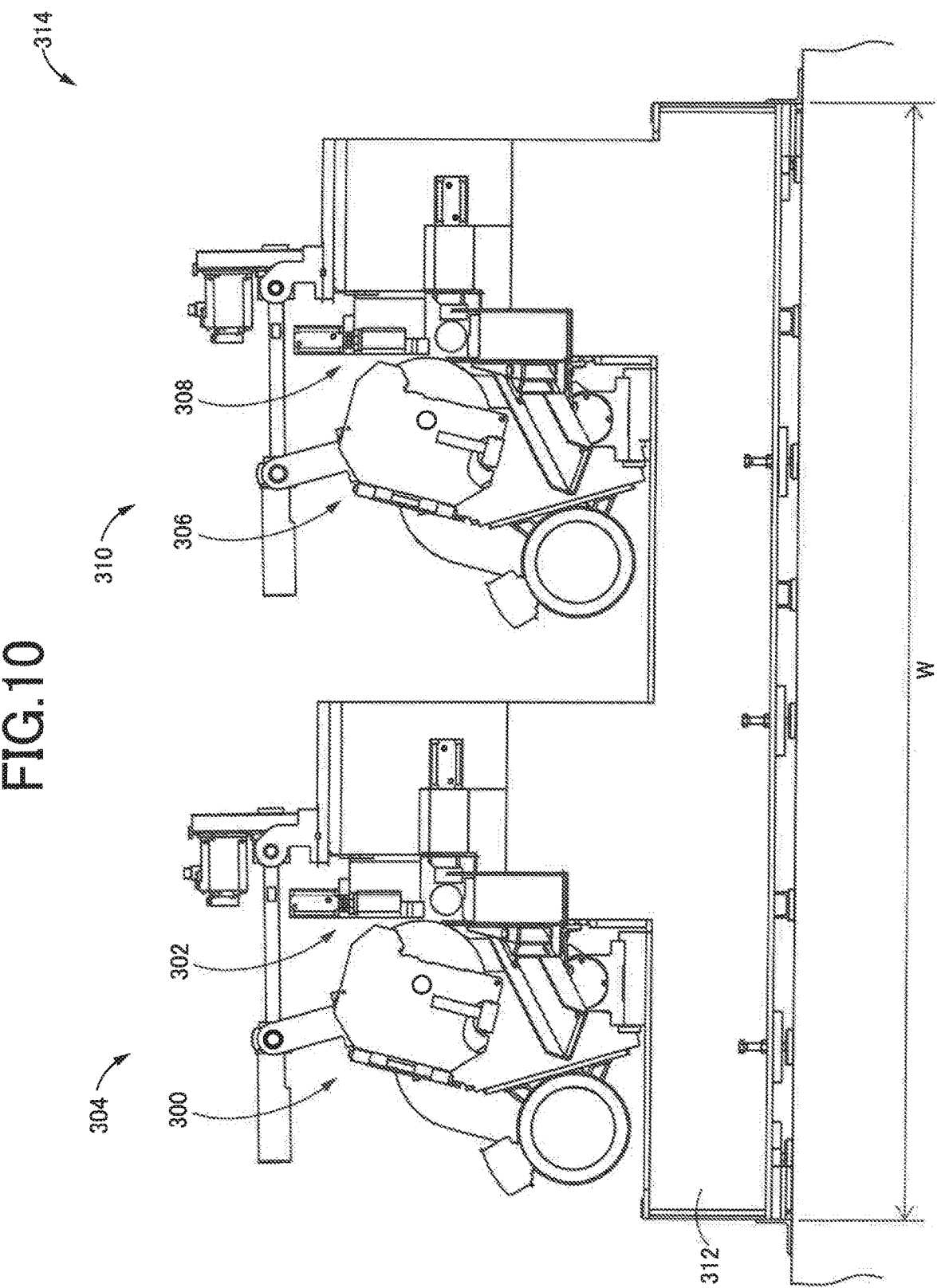
FIG. 10 is a front view of a twin-head bar cutting device of a comparative example.

FIG. 9 is a front view showing a twin-head bar cutting device 210 according to still another example of the present invention. As compared to the twin-head bar cutting device 110 described above, although the first bar holding device 28 and the second bar holding device 48 are arranged symmetrically about the vertical plane PP passing through the center in the width direction of a holding device placement surface 264 in the same way, the twin-head bar cutting device 210 of this example is different in that a first placement surface 260 and a second placement surface 262 of a base 212 are inclined surfaces inclined such that height becomes lower as the surfaces 260 and 262 approach each other, that the holding device placement surface 264 disposed between the first placement surface 260 and the second placement surface 262 with the first bar holding device 28 and the second bar holding device 48 placed thereon is disposed horizontally and higher than lowest height positions of the first placement surface 260 and the second placement surface 262, and that the first placement surface 260 and the second placement surface 262 are provided with a first guide rail 266 and a second guide rail 268 linearly guiding the first cutting head H1 and the second cutting head H2 so as to allow the first circular saw 17 and the second circular saw 37 to cut the first bar BL1 and the second bar BL2 held by the first bar holding device 28 and the second bar holding device 48 on the holding device placement surface 264.

The first cutting head H1 includes the disk-shaped first circular saw 17 supported rotatably around the first rotation center line C1, the first electric motor 24 having the output shaft 18 rotating around the second rotation center line C2 parallel to the first rotation center line C1 and rotationally driving the first circular saw 17 via the first transmission belt 20 and the first speed reducer 22, a first slide frame 226 supporting the first circular saw 17 and the first electric motor 24 and linearly guided by the first guide rail 266, and a first slide actuator 227 moving the first slide frame 226 to allow the first circular saw 17 to cut the first bar BL1.

Similarly, the second cutting head H2 includes the disk-shaped second circular saw 37 supported rotatably around the third rotation center line C3, the second electric motor 44 having the output shaft 38 rotating around the fourth rotation center line C4 parallel to the third rotation center line C3 and rotationally driving the second circular saw 37 via the second transmission belt 40 and the second speed reducer 42, a second slide frame 246 supporting the second circular saw 37 and the second electric motor 44 and linearly guided by the second guide rail 268, and a second slide actuator 247 moving the second slide frame 246 to allow the second circular saw 37 to cut the second bar BL2.

As in the examples described above, the first cutting head H1 and the second cutting head H2 of this example are arranged symmetrically about the vertical plane PP passing through the center in the width W direction of the base 212, i.e., the center in the width direction of the holding device placement surface 264.

According to the twin-head bar cutting device 210 of this example, the holding device placement surface 264 with the first bar holding device 28 and the second bar holding device 48 placed thereon is disposed between the first placement surface 260 and the second placement surface 262. As a result, the base 212 is made higher at the center in the width W direction and is symmetric about the vertical plane PP at the center in the width direction, so that the base 212 has a small size and high rigidity.

Additionally, the first placement surface 260 is provided with the first guide rail 266 linearly guiding the first cutting head H1 so as to cut the first bar BL1 held by the first bar holding device 28 on the holding device placement surface 264, and the second placement surface 262 is provided with the second guide rail 268 linearly guiding the second cutting head H2 so as to cut the second bar BL2 held by the second bar holding device 48 on the holding device placement surface 264. As a result, the first cutting head H1 and the second cutting head H2 advantageously have the first circular saw 17 and the second circular saw 37 urged by a pressing force in accordance with the gravity in the direction of cutting of the first bar BL1 and the second bar BL2 held by the first bar holding device 28 and the second bar holding device 48, respectively.

Although examples of the present invention have been described in detail with reference to the drawings, the present invention is not limited to the examples and may be implemented in other forms.

For example, the first circular saw 17 and the second circular saw 37 described above are provided with a device spraying a mist of lubricating oil as necessary.

The above description is merely an embodiment, and although not exemplarily illustrated one by one, the present invention can be implemented in variously modified and improved forms based on the knowledge of those skilled in the art without departing from the spirit thereof.

REFERENCE SIGNS LIST 10, 110, 210: twin-head bar cutting device
12, 112, 212: base
14: first cutting machine
16: second cutting machine
17: first circular saw
18: output shaft
20: first transmission belt
22: first speed reducer 24: first electric motor
26: first pivot frame
27: first pivot actuator
27a: bracket
27b: motor
27c: screw shaft
27d: nut member
28: first bar holding device
29: first fixed horizontal holding vise (first fixed holding vise)
30: first movable horizontal holding vise (first movable holding vise)
31: first horizontal holding actuator (first holding actuator)
32: first horizontal-direction holding device
33: first fixed vertical holding vise (first fixed holding vise)
34: first movable vertical holding vise (first movable holding vise)
35: first vertical holding actuator (first holding actuator)
36: first vertical-direction holding device
37: second circular saw
38: output shaft
40: second transmission belt
42: second speed reducer
44: second electric motor
46: second pivot frame
47: second pivot actuator
47a: bracket
47b: motor
47c: screw shaft
47d: nut member
48: second bar holding device
49: second horizontal-direction holding device
50: second fixed horizontal holding vise (second fixed holding vise)
52: second movable horizontal holding vise (second movable holding vise)
54: second horizontal holding actuator (second holding actuator)
55: second fixed vertical holding vise (second fixed holding vise)
56: second movable vertical holding vise (second movable holding vise)
57: second vertical holding actuator (second holding actuator)
58: second vertical-direction holding device
60, 160, 260: first placement surface
62, 162, 262: second placement surface
64, 164, 264: holding device placement surface
70: first constant-rate material feeding device
72: second constant-rate material feeding device
74, 75: chute
21
226: first slide frame
227: first slide actuator
246: second slide frame
247: second slide actuator
266: first guide rail
268: second guide rail C1-C4: rotation center line
CR1, CR2: pivot center line
W: width dimension of the base
PP: vertical plane
FL: floor
BL1: first bar
BL2: second bar

What is claimed is:

1. A twin-head bar cutting device including:
a first cutting head and a first bar holding device, the first bar holding device being configured to hold a first work piece to be cut by the first cutting head, and
a second cutting head and a second bar holding device that are placed on a common base with the first cutting head and the first bar holding device, the second bar holding device being configured to hold a second work piece to be cut by the second cutting head, wherein:
the base includes a first placement surface on which the first cutting head is placed, a second placement surface on which the second cutting head is placed, and a holding device placement surface formed higher than the first placement surface and the second placement surface between the first placement surface and the second placement surface and on which the first bar holding device and the second bar holding device are placed,
the first cutting head and the second cutting head are arranged symmetrically about a vertical plane passing through a center in a width direction of the base,
the first placement surface and the second placement surface are inclined surfaces inclined such that a height of the first placement surface and the second placement surface becomes lower as the first placement surface and the second placement surface approach each other,
the holding device placement surface is disposed horizontally and is higher than a lowest height position of each of the first placement surface and the second placement surface, and
the first bar holding device and the second bar holding device are arranged symmetrically about a vertical plane passing through a center in a width direction of the holding device placement surface.

2. The twin-head bar cutting device according to claim 1, wherein:
the first placement surface is disposed at the same height as the second placement surface.

3. The twin-head bar cutting device according to claim 1, wherein:
the first placement surface is provided with a first guide rail configured to linearly guide the first cutting head so as to cut the first work piece held by the first bar holding device on the holding device placement surface, and
a second placement surface is provided with a second guide rail configured to linearly guide the second cutting head so as to cut the second work piece held by the second bar holding device on the holding device placement surface.

* * * * *